Patented Jan. 27, 1948

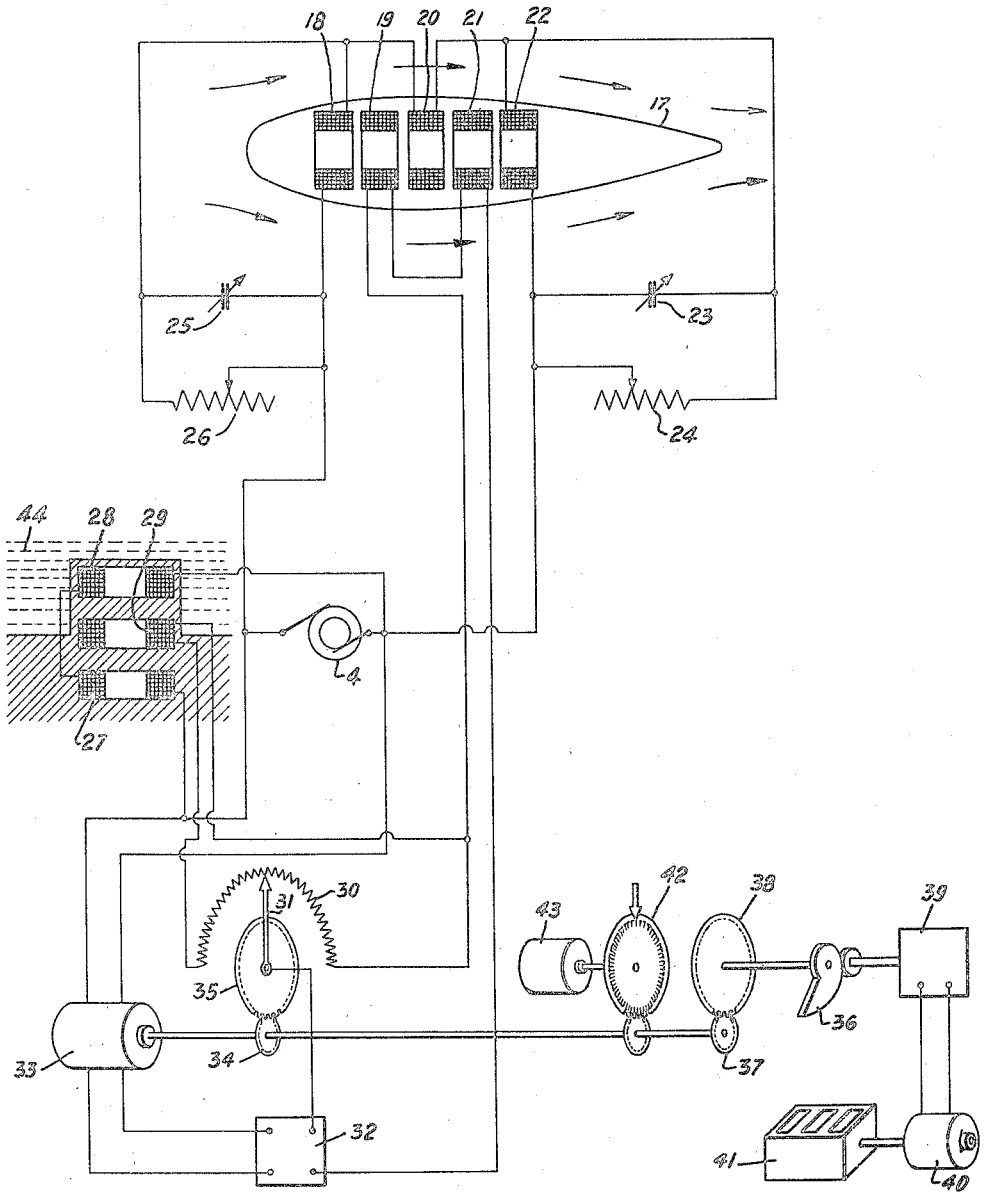

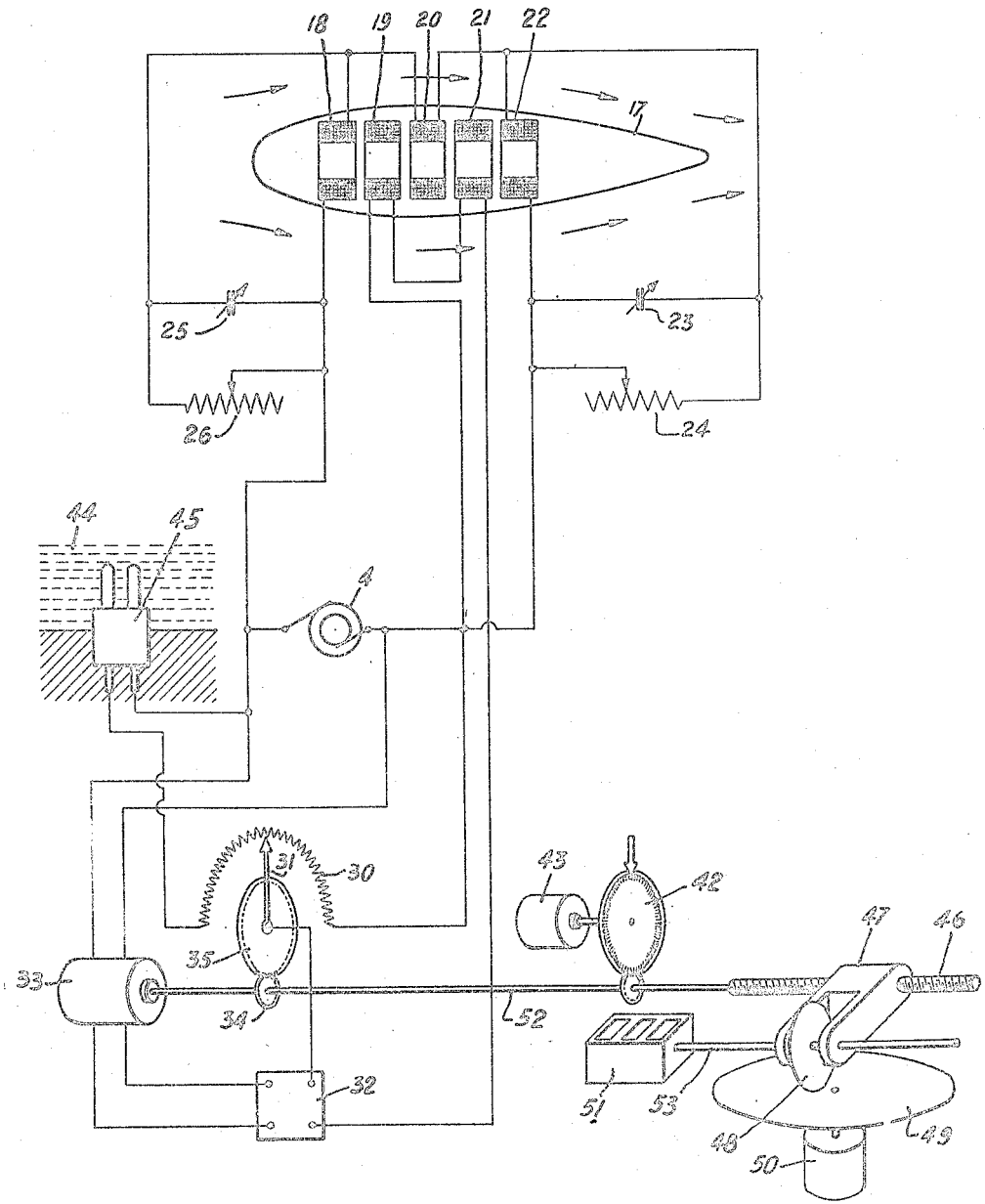

2,435,043

UNITED STATES PATENT OFFICE 2,435,043

DEVICE FOR MEASURING RATE OF FLUID FLOW

Henry Lehde and Walter T. Lang, Brooklyn, N. Y., assignors to Control Instrument Company, Inc., Brooklyn, N. Y., a corporation of New York Application October 6, 1944, Serial No. 557,531

3 Claims. (Cl. 73—194)

The present invention relates to improvements in speed measuring devices, and in particular to a type employed for the measurement of the velocity of a fluid which is an electrical conductor.

In the general organization of the device, the conducting fluid flows through a magnetic field, and by reason of its motion, an induced E. M. F. is set up in the fluid. This induced E. M. F. controls an indicating element to give a direct indication of the velocity of the fluid.

It is an object of the invention to produce an improved inductive speed indicator for conducting fluids which is simple in construction and operation, and wherein elimination of electrical contact with the conducting medium in measurement of the induced voltage is obtained, thus avoiding all problems associated with the use of electrodes, such as contamination, clogging, temperature variations, polarization and the like.

A further object is to eliminate errors caused by changes in conductivity of the fluid, or by changes in the applied magnetic field, or in the supply voltage.

Still another object is to provide means for integration of the speed of the fluid, so that readings of distance or of fluid volume may be obtained, depending on the specific application of the invention.

Other objects and advantages of the invention will appear in the course of the description, particularly in its application to the problems of measuring the speed and distance traveled by a ship in salt water.

The inventive idea involved is capable of receiving a variety of expressions some of which, for purposes of illustration only, are shown in the accompanying drawings.

In the drawings:

Fig. 3 is a schematic diagram of a speed and distance measuring instrument for ships employing the arrangement illustrated in Fig. 1, and Fig. 4 is a modification of Fig. 3, illustrating other means of adapting Fig. 1 to the measurement of speed and distance.

Figure 1:
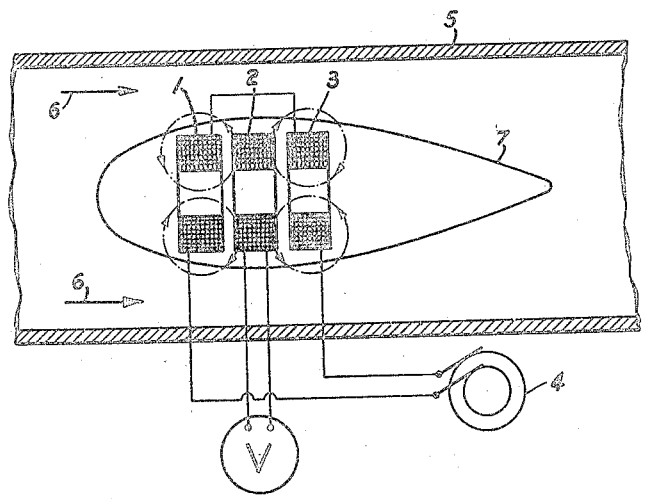
Fig. 1 is a schematic diagram of the embodiment of the invention in its simplest form.

In Fig. 1, 7 indicates a streamlined housing of insulating material within which is located the coils 1, 2 and 3 on the same magnetic axis. Coils 1 and 3 are energized in series by the A. C. generator 4, and are connected so that their magnetic effects oppose each other. The resultant magnetic field is indicated by the circular paths shown linking with the coils. Coil 2 is placed midway between coils 1 and 3, and when properly positioned, no voltage will be induced in it by the combined inductive effects of coils 1 and 3 since they balance each other. The housing 7 is centrally located within the tube 5, and the conducting fluid flows through the tube around the housing 7 in the direction shown by the large arrows 6. Wherever the magnetic lines of force enter or leave the surface of the housing 7 and have a component at right angles to the flow of the fluid, an induced voltage will be set up in the fluid, because it constitutes a conductor cutting a magnetic field. The magnitude of the voltage will depend upon the speed of the fluid and the flux density. This voltage causes current to flow in a circumferential direction around the housing. The magnetic effects of this current will be added to those flowing in coils 1 and 3, the overall effect being to slightly displace the entire magnetic field in the direction of fluid flow. The fluid, in effect, tends to drag the magnetic field along with it, the field displacement being proportioned to the fluid speed and conductivity. The resultant voltage induced in coil 2 will be directly proportional to the speed, and is measured by the voltmeter V.

Figure 2:
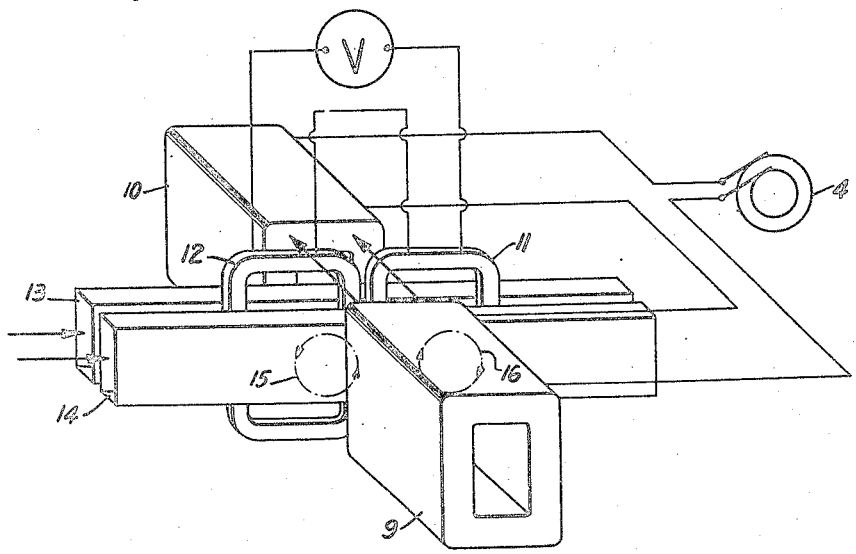
Fig. 2 illustrates another basic form of the invention.

Fig. 2 is an alternative arrangement of coils which can be used to measure the rate of flow of a conducting fluid. The rectangular field coils 9 and 10, which comprise loops that are parallel to the plane of the sheet as shown in Fig. 2 and which are connected in series but not in opposition, are located on the same axis, and are energized by the A. C. generator 4. The conducting fluid flows through the rectangular tubes 13 and 14, which are placed in the magnetic field between the field coils 9 and 10 and are of nonconducting material. The search coils 11 and 12 are connected in series opposition and are placed side by side between tubes 13 and 14 and positioned so that they generate equal and opposite A. C. voltages, when the conducting fluid is not flowing. When the conducting fluid flows through the magnetic field, it constitutes a moving conductor and causes an E. M. F. to be generated in a direction mutually perpendicular to the magnetic field and to the direction of flow. This causes a current to flow in the same direction in the region within the influence of the magnetic field and the return path for this current takes place outside of the magnetic field. The result is equivalent to two closed current loops, as shown in Fig. 2. The current of loop 15 will oppose the main magnetic field, while that due to loop 16 will aid the magnetic field. As in Fig. 1, the net effect is that the fluid flow tends to drag the magnetic field along with it. The resulting displacement causes an unbalance voltage to be generated by coils 11 and 12, which is a measure of the fluid speed.

In either of these arrangements used to measure fluid speed, the readings of the voltmeter V will be subject to errors caused by changes in the magnetic field strength of the field coils and by changes in the conductivity of the fluid. The voltmeter readings are proportional to these factors also. The arrangement illustrated in Fig. 3 may be employed to eliminate these errors.

In Fig. 3, the streamlined housing 17 is attached to a vessel so that motion of the vessel through salt water will cause a practically unobstructed flow of water along the housing (as shown by the arrows). The coils 18, 19, 20, 21 and 22 are located within the housing 17. The field coils 18, 20 and 22 are connected in series and are energized by the A. C. generator 4. Adjacent coils of this group are connected to magnetically oppose each other. Search coils 19 and 21 are connected in series, and are positioned so that they normally pick up no voltage from the field coils. Any number of similar coils can be added to this arrangement to increase the sensitivity. An exact balance for reducing the search coil voltage to zero may be easily obtained by adjustment of the resistance 24 and condenser 23 across coil 22, and by adjustment of resistance 26 and condenser 25 across coil 18. This is employed to adjust the relative magnitudes and phase relations between the field coils to obtain complete balance, and is more satisfactory than attempting to move the search coils with respect to the field coils.

After the proper adjustment has been made, and conducting sea water flows past the housing 17, the flow displaces the magnetic field produced by the field coils, and as described, will produce a voltage proportional to the speed of flow. This voltage is accurately measured by an automatic potentiometer to indicate the speed of the ship, and integrated by an electrical device to give distance in the following manner.

The salinity cell, indicated generally at 27, produces a voltage proportional to the conductivity of the sea water, which depends upon the temperature and the salt concentration of the water. The field coils 27 and 28 are connected in series opposition and are energized by the A. C. generator 4. The search coil 29 is positioned between coils 27 and 28 so that it will pick up no induced voltage when the cell assembly 27 has no conducting material in its immediate vicinity.

However, if sea water 44 is allowed to surround coil 28 and not coil 27, the eddy currents induced in the sea water around coil 28 will reduce its effective field strength. Thus, an unbalance will be produced in coil 29, and the induced voltage will be proportional to the conductivity of the sea water and to the voltage impressed on the coils 27 and 28. The voltage produced by coil 29 is impressed on the resistance 30. A variable portion of this voltage, controlled by the position of the contact arm 31 on the resistance 30 is placed in series opposition to the voltage produced by the search coils 19 and 21. Any unbalance in these voltages is applied to the amplifier 32. The amplified unbalance is led to one phase of the reversible two phase motor 33. The other phase is permanently energized by the A. C. generator 4. The motor 33 drives a gear 34, which, in turn, drives the gear 35 to which is attached the adjustable contact arm 31. Connections are made so that the motor will run in a direction to reduce the unbalance to zero. The contact arm position, and therefore the voltage or speed are indicated by the dial 42, which is geared to motor 33. An electrical transmitter 43 may be employed to transmit values of speed to various locations on the ship.

The voltage induced in coil 29 will be proportioned to the conductivity of the sea water, and to the voltage of the A. C. generator 4. As the voltage produced by coils 19 and 21 is proportional to these factors and also to the rate of flow of the sea water around housing 17, the potentiometer comprising resistance 30 and contact arm 31 will produce a reading which depends only on the speed.

The cam 36 is driven by the motor 33 through the reduction gears 37 and 38. This cam serves to control the frequency of a vacuum tube oscillator 39, so that its frequency is proportional to the speed of the ship. Consequently, the number of oscillations produced will be equal to the time integral of the speed, or the distance. This is registered by the synchronous motor 40 which is employed to drive the counter 41 to indicate distance.

It will be evident that if the housing 17 is placed within a tube through which a conducting fluid flows, as in Fig. 1, the dial 42 will indicate the speed of flow, while the counter 41 will indicate the volume and can be used as a fluid meter.

Fig. 4 illustrates an alternative system of obtaining ship's speed and distance traveled. The coils 18, 20 and 22 are energized by the A. C. generator 4, as described with reference to Fig. 3. Condensers 23 and 25, and resistances 24 and 26, are similarly used to balance the voltages produced by coils 19 and 21.

The salinity cell 45 is placed in the sea water and is connected in series with the resistance 30 across the A. C. generator 4. If the resistance 30 is low in comparison with the resistance of the salinity cell, the current in this circuit will be substantially proportional to the conductivity of the sea water and to the voltage of generator 4.

The voltage generated in coils 19 and 21 is connected in series opposition to a portion of the voltage drop across resistance 30, controlled by the position of the contact arm 31. Any unbalance in these voltages is applied to the input of the amplifier 32 which operates the reversible two phase motor 33 to automatically balance the voltage, as described with reference to Fig. 3. The dial 42 is geared to the motor 33 through the shaft 52 to indicate speed. The lead screw 46 is driven by the shaft 52 to move the traveling nut 47. This positions the wheel 48 over the disk 49, which is geared to the constant speed motor 50. A splined shaft 53 is driven by the wheel 48, and rotates the counter 51. If the wheel 48 is positioned so that its distance from the center of rotation of the disk 49 is proportional to the speed, its rotation will be proportional to the time integral of fluid speed, or the distance traveled, which is indicated by the counter 51.

Automatic compensation for variations in the conductivity of the sea water and in the voltage supplied by the generator 4, is obtained by employing the salinity cell 45 to control the current through the resistance 30. The voltage drop across the cell 45 varies in accordance with the cell conductivity and with the supply voltage, and as in Fig. 3, these factors will not affect the potentiometer balance.

In the design of the magnetic coil arrangement, it is desirable to employ a large number of turns of wire in the search coils 19 and 21 to increase the voltage sensitivity. Careful electrostatic shielding of the coils should be employed and the coil spacing must be maintained with a high degree of accuracy. It is therefore desirable to pay considerable attention to temperature expansion and to the selection of the materials employed in constructing the supporting structure for the coils. While a uniform overall expansion of the coil assembly should not disturb the coil adjustment, any expansion of an asymmetrical nature or a non-uniform dissipation of the heat generated in the field coils will cause dimensional changes that may produce a voltage unbalance.

However, should such voltage unbalances occur and cause an error in the indicated ship speed, the apparatus can be readjusted by means of the shunt resistances 24 and 26 and the shunt condensers 23 and 25. When the fluid flow has ceased, or is at right angles to the housing 17, these shunts may be adjusted to reduce the unbalanced voltage to zero.

Reversal of the fluid flow will reverse the polarity of the induced voltage which will then be added with an opposite sign to any spurious voltage unbalance that may be present. This also provides a means of readjustment. The averaging of indications taken with the housing 17 in the normal and in the reversed position will also give the true speed regardless of spurious unbalanced voltages, provided the phase relationships of the voltages are considered.

Other magnetic coil arrangements may be used to create a magnetic field which is displaced by the flow of a conducting fluid. Various devices and circuits well known to the art of magnetic and electrical measurements may be employed to detect such displacement of a magnetic field. The scope of the invention is, therefore, not to be limited except as indicated by the following claims.

What is claimed is:

1. An instrument for measuring the flow of a conducting fluid, comprising means to create a magnetic field, means for causing said fluid to flow through said field, opposed search coils associated with said field, and means for measuring the unbalance voltage produced in said search coils by said flow.

2. An instrument for measuring the flow of a conducting fluid, comprising means to create opposed magnetic fields through which said fluid is adapted to flow, a search coil system associated with said fields having a voltage induced in response to the flow of fluid through said fields, means connected to said system to compensate for variations in said induced voltage due to changes in the conductivity of said fluid, and means to measure said compensated induced voltage.

3. An instrument for measuring the flow of a conducting fluid, comprising means to create opposed magnetic fields through which said fluid is adapted to flow, a search coil system associated with said fields having a voltage induced in response to the flow of fluid through said fields, means connected to said system including a salinity cell and a variable resistance coupled to said system for compensating for variations in said induced voltage due to changes in the conductivity of said fluid, and means to measure said compensated induced voltage.

HENRY LEHDE.
WALTER T. LANG.

REFERENCES CITED

The following references are of record in the file of this patent:

UNITED STATES PATENTS

| Number | Name | Date |
| --- | --- | --- |
| 1,992,100 | Stein | Feb. 19, 1935 |
| 1,249,530 | Smith et al. | Dec. 11, 1917 |
| 2,149,847 | Kolin | Mar. 7, 1939 |
| 2,220,070 | Aiken | Nov. 5, 1940 |